US010861144B1

(12) United States Patent
Guan et al.

(10) Patent No.: US 10,861,144 B1
(45) Date of Patent: Dec. 8, 2020

(54) IMAGE-PROCESSING METHOD

(71) Applicant: PANASONIC INTELLECTUAL PROPERTY MANAGEMENT CO., LTD., Osaka (JP)

(72) Inventors: Xibeijia Guan, Singapore (SG); Jeevan Kumar Guntammagari, Singapore (SG); Myo Htun, Singapore (SG); Ariel Beck, Singapore (SG); Myo Min Latt, Singapore (SG); Roy Eng Chye Lim, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/698,493

(22) Filed: Nov. 27, 2019

(51) Int. Cl.
| | |
|---|---|
| *G06T 5/50* | (2006.01) |
| *G06T 3/20* | (2006.01) |
| *G06T 3/00* | (2006.01) |
| *G06T 5/00* | (2006.01) |
| *G06K 9/62* | (2006.01) |
| *H04N 5/247* | (2006.01) |
| *H04N 5/225* | (2006.01) |
| *G06K 9/00* | (2006.01) |
| *H04N 5/232* | (2006.01) |

(52) U.S. Cl.
CPC ............ *G06T 5/50* (2013.01); *G06K 9/00335* (2013.01); *G06K 9/00369* (2013.01); *G06K 9/00845* (2013.01); *G06K 9/6256* (2013.01); *G06T 3/0012* (2013.01); *G06T 3/20* (2013.01); *G06T 5/005* (2013.01); *H04N 5/2253* (2013.01); *H04N 5/23299* (2018.08); *H04N 5/247* (2013.01); *G06T 2207/10012* (2013.01); *G06T 2207/10028* (2013.01); *G06T 2207/10048* (2013.01); *G06T 2207/20081* (2013.01); *G06T 2207/30196* (2013.01); *G06T 2207/30268* (2013.01)

(58) Field of Classification Search
CPC ....................................................... G06N 3/08
See application file for complete search history.

(56) References Cited

U.S. PATENT DOCUMENTS

| | | | | |
|---|---|---|---|---|
| 8,334,893 | B2 | 12/2012 | Hartman | |
| 9,959,457 | B2 * | 5/2018 | Suh | ................... G06K 9/00288 |
| 10,395,098 | B2 * | 8/2019 | Hwang | ............. G06K 9/00288 |
| 10,703,268 | B2 * | 7/2020 | Levkova | ............ G06K 9/00597 |
| 2007/0086624 | A1 * | 4/2007 | Breed | ................ G06K 9/00832 |
| | | | | 382/104 |

(Continued)

FOREIGN PATENT DOCUMENTS

WO   2019/069369 A1   4/2019

*Primary Examiner* — Paulos M Natnael
(74) *Attorney, Agent, or Firm* — McDermott Will & Emery LLP

(57) ABSTRACT

The present subject matter refers an image-processing method comprises receiving a first-image of an object captured by a range-imaging device at a first viewing location. The transforming the first-image into a second image of the object, said second image corresponding to an image captured based on range-imaging at a second viewing location with respect to the object. The gaps in the second-image are identified based on comparison with the first image, such that the identified gaps within the second image are complemented to result in a complemented second image.

17 Claims, 12 Drawing Sheets

(56) References Cited

U.S. PATENT DOCUMENTS

| | | | |
|---|---|---|---|
| 2013/0038700 A1* | 2/2013 | Horita | G02B 7/36 |
| | | | 348/47 |
| 2013/0128003 A1* | 5/2013 | Kishida | H04N 13/296 |
| | | | 348/47 |
| 2018/0239937 A1* | 8/2018 | Nagata | G06K 7/1413 |
| 2019/0152390 A1* | 5/2019 | Levkova | G06K 9/00228 |
| 2019/0268535 A1* | 8/2019 | Jinno | H04N 5/2258 |
| 2020/0082508 A1* | 3/2020 | Alletto | G06T 5/50 |
| 2020/0088855 A1* | 3/2020 | Zhu | G06T 3/4076 |

\* cited by examiner (b)

(c)

(a)

IMAGE-PROCESSING METHOD

TECHNICAL FIELD

The present subject matter relates to generally to an imaging system in a vehicle and, more particularly to predicting a vehicle-driver's skeleton.

BACKGROUND

While driving a vehicle, a driver is prone to fall into various states such as developing backache or feeling sleepy. Such states eventually lead to distraction to the driver and causes the risk of vehicle-accidents, thereby warranting serious consideration.

At least a reason that may be attributed to such unwanted state of the driver is bad body posture of the driver. Apart from the being accidental in nature, the driver itself incurs the risk of developing neck pain, lower back pain, various physical health problems like the sciatic nerve.

Accordingly, the contemporary vehicles employ various mechanisms to detect incorrect body postures of the drivers. One of such mechanism is providing alerts in real-time to the driver about the incorrect postures. The same is executed at least by observing the driver and postures through camera-systems. In an example, such systems capture the images through a vision system and thereby predict a driver's-skeleton based on the captured images and a predictive-analysis of the same. In an example, the vision system may employ plurality of cameras to monitor the driver from two viewpoints and based thereupon predict the skeleton through a correlation, artificial neural networks, deep learning etc. or regressive learning procedure.

However, capturing images from the multiple viewpoints involves processing different figures and accordingly offsetting the disparity there-between. In an example, the position of camera having the required electronics for Artificial Intelligence (AI)/machine learning (ML) is different from a normal camera. While the AI/ML based camera may be more accurate than other camera, the overall AI output decreases due to such disparity between the cameras. More further, the skeletons predicted from two view-points are found to be usually incoherent with respect to each other. Accordingly, despite employment of machine learning, the divergence between the two viewpoints leads to an inaccurately predicted skeleton.

In-accurately predicted skeletons of the driver are all but likely to generate false triggers for the driver. A driver unware of the correct posture required while driving and misled by false triggering is probable to develop deteriorated health that in turn compromises the life of the driver in long run. Moreover, inaccurately predicted skeleton requires further refinement and correction that leads to an additional overhead.

Likewise, the aforesaid problems with respect to the vehicle driver scenario may also be associated with other non-vehicular scenarios wherein the prediction of skeleton of a living being is executed in a multi-camera environment.

There lies a need of improved image processing techniques in a multi-camera environment to reduce the disparity among the captured images.

There lies at least of predicting skeleton of a living being accurately based on images captured in the multi-camera environment.

SUMMARY

This summary is provided to introduce a selection of concepts in a simplified format that is further described in the detailed description of the present disclosure. This summary is neither intended to identify key inventive concepts of the disclosure nor is it intended for determining the scope of the invention or disclosure.

In an implementation, the image-processing method comprises receiving a first-image of an object captured by a range-imaging device at a first viewing location. The transforming the first-image into a second image of the object, said second image corresponding to an image captured based on range-imaging at a second viewing location with respect to the object. The gaps in the second-image are identified based on comparison with the first image, such that the identified gaps within the second image are complemented to result in a complemented second image. In other words, the second image is corrected to complement a gap between the first viewing location and second viewing location to result in a complemented second image.

In another embodiment, the present subject matter illustrates a method for skeleton based action-recognition by imaging an object. The method comprises receiving a first-image of an object captured by a range-imaging device at a first viewing location, and transforming the first-image into a second image of the object. The second image corresponds to an image captured based on range-imaging at a second viewing location with respect to the object. The identified gaps within the second image are identified with reference to the first image to thereby result in a complemented second image. In other words, the second image is corrected to complement a gap between the first viewing location and second viewing location to result in a complemented second image. A skeleton-structure of the object is estimated by a predictive-analysis module based on the complemented second image to facilitate skeletal based action recognition of the object.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
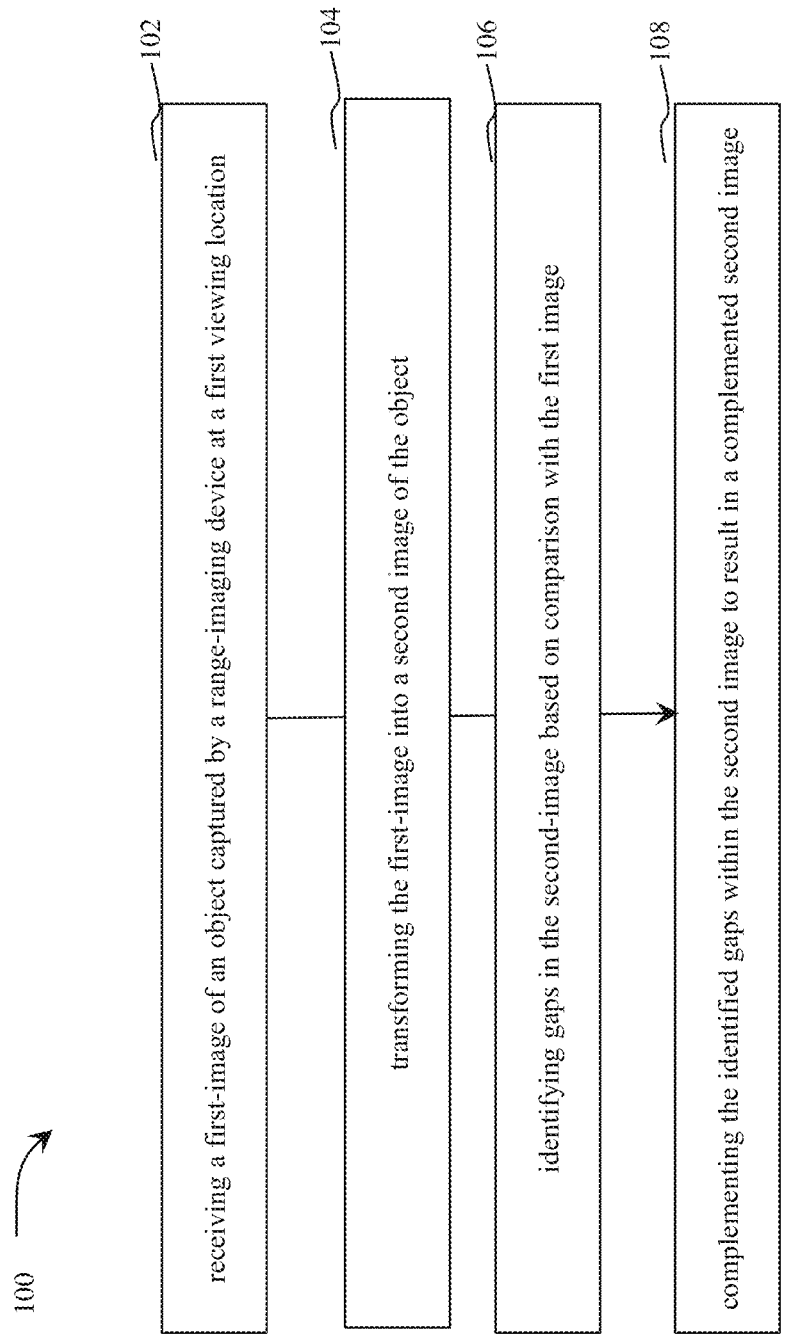
FIG. 1 illustrates method steps in accordance with an embodiment of the present subject matter.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF SOME EXAMPLE EMBODIMENTS

For the purpose of promoting an understanding of the principles of the present disclosure, reference will now be made to the embodiment illustrated in the drawings and specific language will be used to describe the same. It will be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or subsystems or elements or structures or components proceeded by "comprises . . . a" does not, without more constraints, preclude the existence of other devices or other subsystems or other elements or other structures or other components or additional devices or additional subsystems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

In an embodiment, FIG. 1 illustrates an image-processing method. The method comprises receiving (step 102) a first-image of an object captured by a range-imaging device at a first viewing-location.

The first-image is transformed (step 104) into a second image of the object, such that the second image corresponds to an image captured based on range-imaging at a second viewing location with respect to the object. In an implementation, the transformation comprises transforming of the first image into the second image. A first point-cloud is extracted from the first image captured as a depth image by a TOF camera acting as the range-imaging device at the first viewing location. Thereafter, a pre-defined transformational matrix is accessed for depicting a coordinate-mapping between images captured from the first viewing location and the second viewing location. The first point cloud is converted into a second point cloud based on the transformational matrix.

In an implementation, the pre-defined transformation matrix is generated by receiving at least one image of the object captured from the first viewing location and at least one another image of the object captured from the second viewing location. A plurality of points within each of said two captured images may be designated by generating a point cloud based on the designated points for each of the two images. Said two point clouds are compared with each other to generate a transformational matrix.

Further, the method comprises identifying (step 106) gaps in the second-image based on comparison with the first image. In an implementation, the identification of gaps within the second image comprises identifying pixel-gaps within the second point cloud based on comparison with the first point cloud.

Further, the method comprises complementing (step 108) the identified gaps within the second image to result in a complemented second image. The complemented second image is communicated to a machine-learning (ML) unit, wherein said ML unit is configured to be trained at least based on one or more images of the object captured from the second viewing location by another range-imaging device. In an implementation, said complementing of the identified gaps within the second image comprises filling the identified pixel-gaps within the second point cloud based on a pre-defined mechanism to complement the pixel-gaps within the second point cloud, and obtaining a complemented second point cloud as the complemented second image.

In an implementation, the method further comprises communicating the complemented second image (or a complemented point cloud) to a machine-learning (ML) unit, wherein said ML unit is configured to be trained at least based on one or more images of the object captured from the second viewing location by another range-imaging device. The ML unit may be configured for estimating a skeleton-structure of the object and thereby recognize a skeleton-based action of the object. The sending of the complemented second image to the ML unit comprises sending a complemented second point cloud to the ML unit.

In an example, the ML unit may be a predictive-analysis module that may be configured to be trained at least based on one or more images of the object captured from the second viewing location by another range-imaging device.

Figure 2:
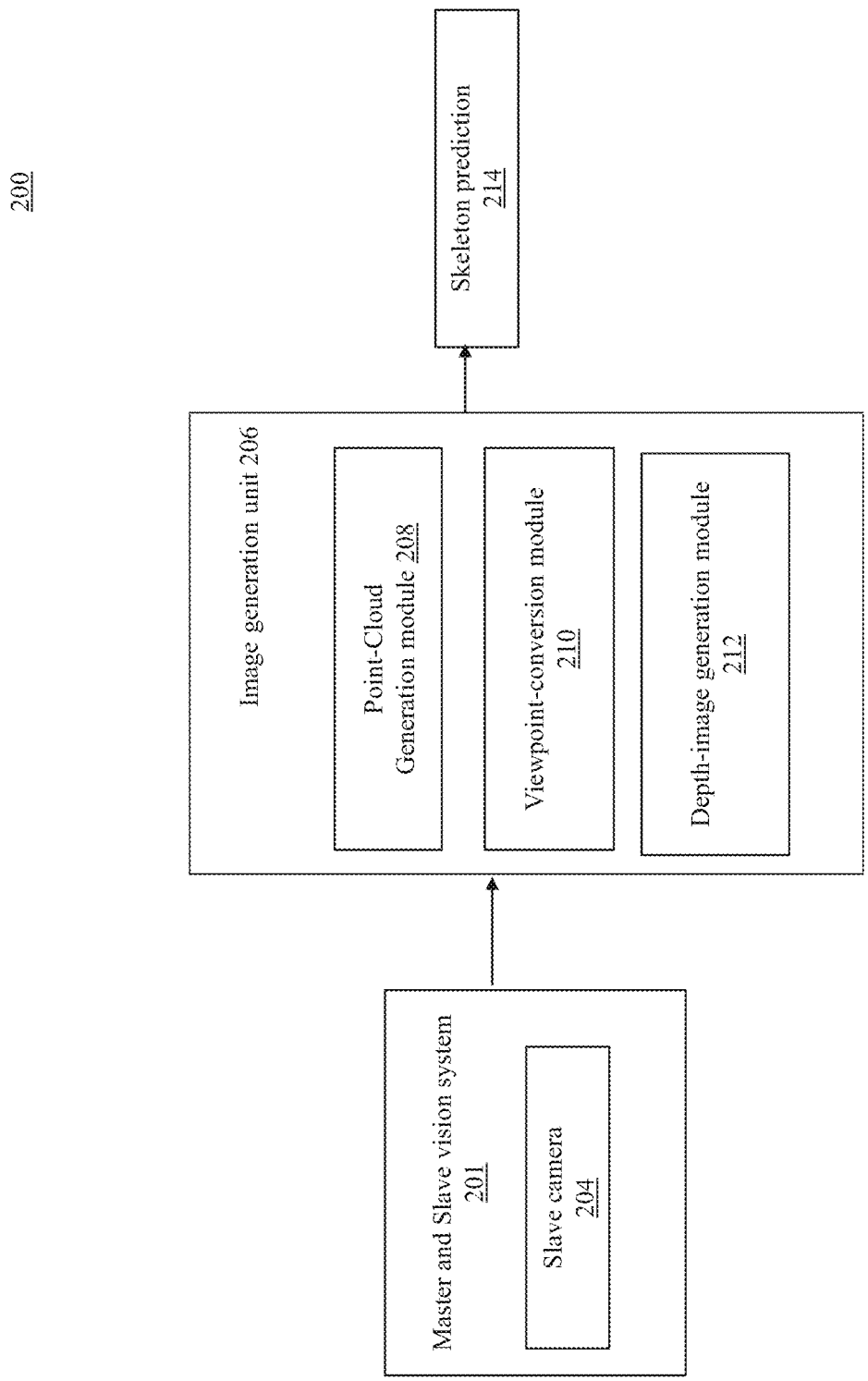
FIG. 2 illustrates a schematic-architecture based on the method steps of FIG. 1, in accordance with an embodiment of the present subject matter.

FIG. 2 illustrates a schematic-architecture based on the method steps of FIG. 1, in accordance with an embodiment of the present subject matter. More specifically, FIG. 2 illustrates an optical-imaging system 200. The system 200 comprises a master-slave vision system 201 comprising at-least one range-imaging device (e.g. a master camera 202 depicted in later figures) for capturing image from at least one viewing location. The range-imaging device at the first viewing location operates is based on at-least one of: Stereo triangulation, Sheet of light triangulation, Structured light, Time-of-flight, Interferometry, Coded aperture, etc.

In an implementation, with respect to the second viewpoint, the optical imaging system comprises another camera (e.g. a slave camera 204) forming a part of the master-slave vision system 201 for imaging the object from the second viewing location. The another camera 204 is defined as one or more of: a range-imaging device, an infra-red camera, and a photography camera. In other implementation, the a single range imaging device may be movable to capture images of the object both from the first viewing location and the second viewing location The range imaging device is defined at-least as one of the master camera 202, and the slave camera 204. The slave camera 204 is configured for communicating said master camera 202 the image data captured by the slave camera 204. In an example application, the master/slave range imaging device is implemented inside a vehicle and defined by at least one of the master camera mounted at a central location acting as the first viewing location within the vehicle. As shown later in FIG. 3a, the slave camera is offset from the central location by a pre-determined distance and mounted at the second viewing location within the vehicle.

An image-generation unit 206 is configured for receiving a first-image of an object captured from a first viewing location by said at least one range-imaging device. The image as received is converted into a point cloud data by a point cloud data generation module 208 present within the unit 206. In an example, the master-camera 202 houses said image generation unit 206 that receives image-data captured by said master camera and the one slave camera. The image-generation unit 206 may be defined at-least one of a processing unit of the master camera, or a processing module forming a part of the engine control unit (ECU) of the vehicle.

The first-image is transformed into a second image of the object by a viewpoint conversion module 210, such that the second image corresponds to an image captured by range-imaging at a second viewing location with respect to the object. The gaps in the second-image are identified based on comparison with the first image; and thereafter the identified gaps are complemented within the second image to result in a complemented second image. In other words, the second image is corrected to complement a gap between the first viewing location and second viewing location to result in a complemented second image. Further, the complemented image is converted into a depth image by a depth image generation module 212.

Further, the system comprises a predictive-analysis unit 214 operating based on machine learning (ML) and configured to be trained at least based on one or more images of the object captured from the second viewing location by another range-imaging device. The analysis unit 214 or the ML unit is configured for estimating a skeleton-structure of the imaged object and thereby recognize skeleton-based action of the object.

Figure 3:
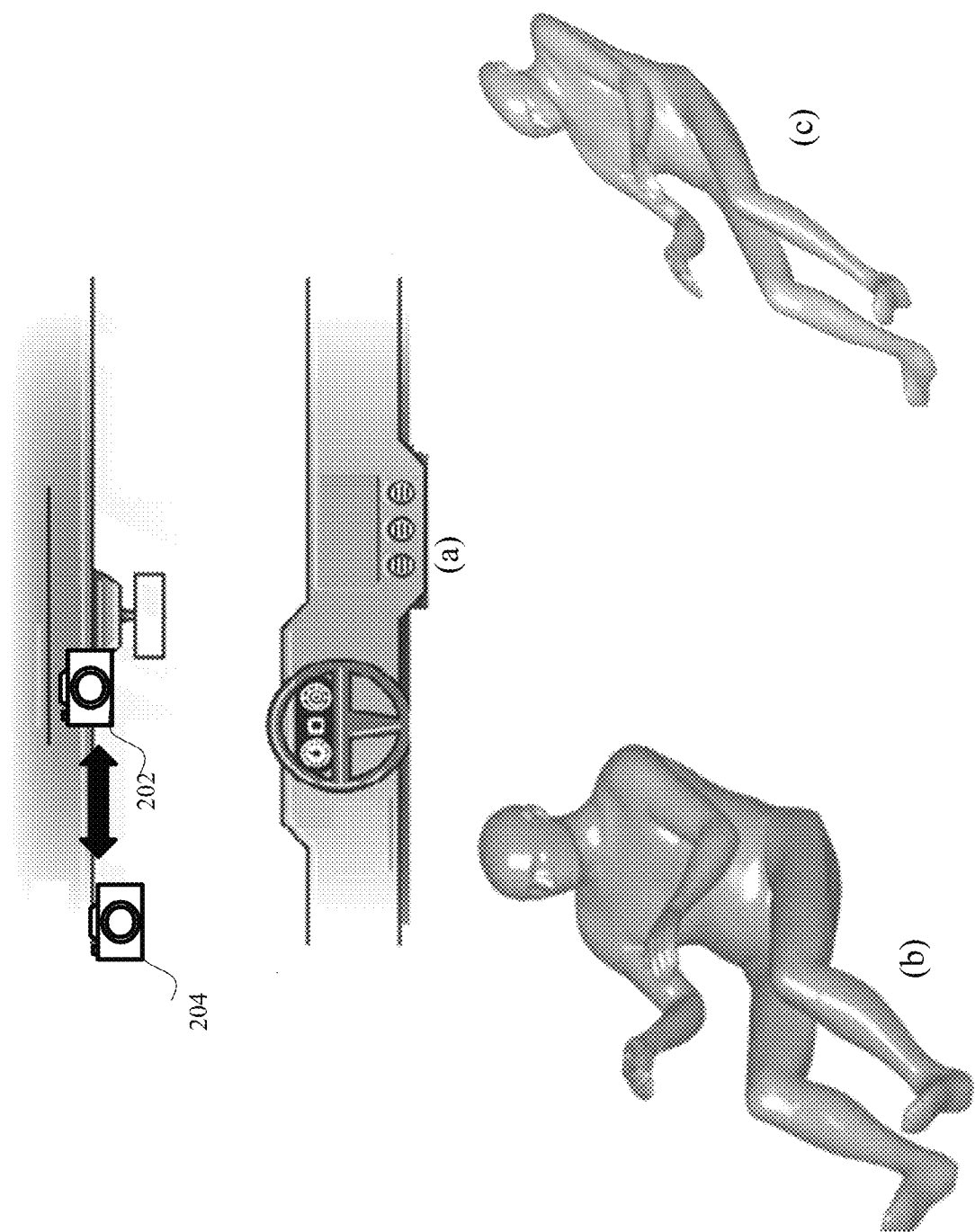
FIG. 3 illustrates example system implementation in accordance with an embodiment of the present subject matter.

FIG. 3 illustrates example system implementation in accordance with an embodiment of the present subject matter. In an example, the present implementation as referred in FIG. 3a refers an environment within a vehicle such as a car where at least two cameras may be mounted. The first camera 202 may be mounted at the inside rear-view mirror, while the second camera 204 as mounted may be offset from the first camera 202 and mounted directly upon the vehicle. FIG. 3b represents an example image captured with respect to the driver in the car by the first camera 202, while FIG. 3c refers other example image captured with respect to the driver in the car from the second-camera 204. Accordingly, the FIG. 3b and FIG. 3c represents images captured from two different viewpoints within the car. While FIG. 3b and FIG. 3c actually represent a three dimensional models of a human being, the same is merely for representational purposes only and such simulated model may be construed as representative of IR images or photographic as captured with respect to the human being who is driving the car.

Figure 4:
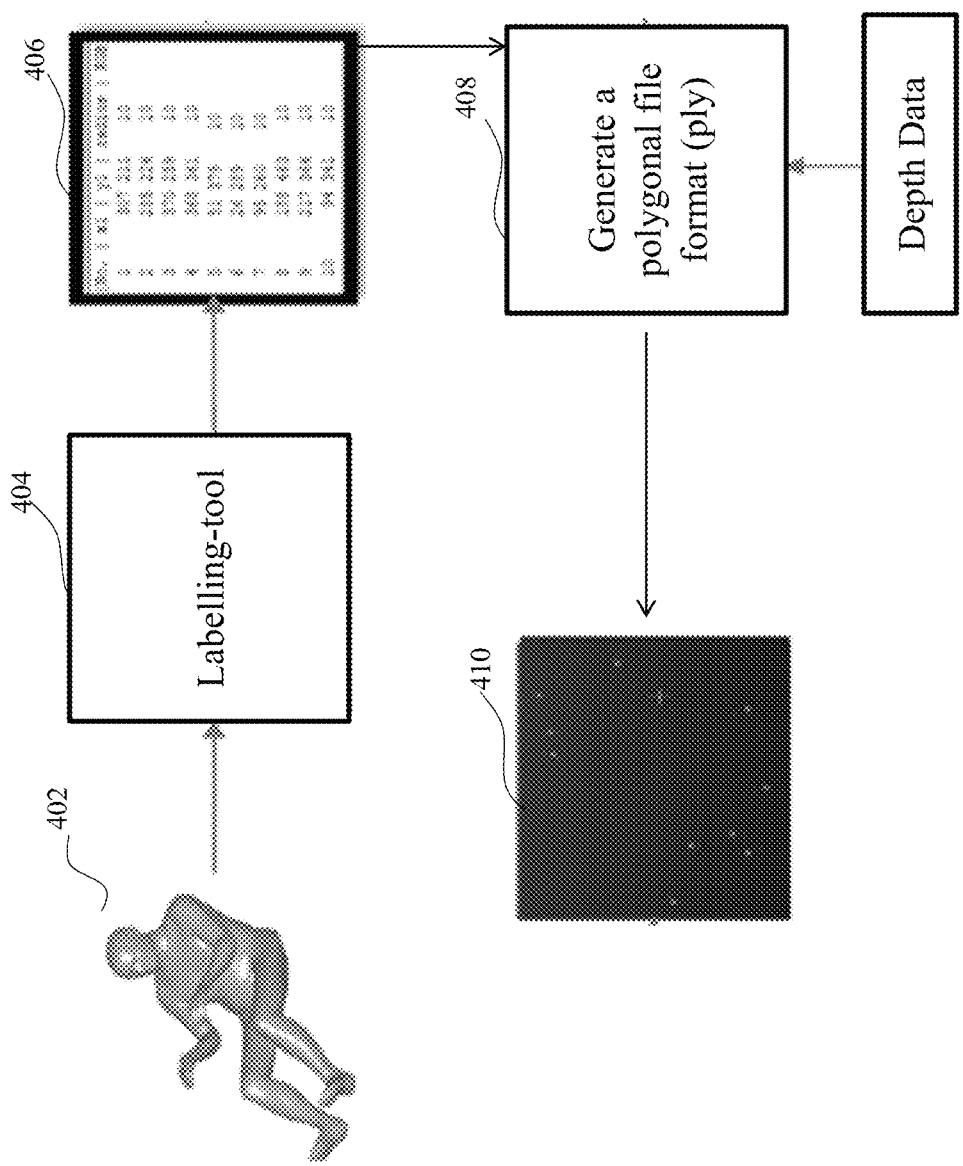
FIG. 4 illustrates an example implementation of the method steps, in accordance with an embodiment of the present subject matter.

FIG. 4 illustrates an example implementation of the method steps, in accordance with an embodiment of the present subject matter. FIG. 4 illustrates an example implementation of the method steps of FIG. 1, in accordance with an embodiment of the present embodiment. More specifically, the steps of FIG. 4 correspond to steps 102 and 104 of FIG. 1.

At step 402, an IR image of the driver of the vehicle as captured by the first camera 202 is received.

At step 404, three or more points are selected upon the image as received in the step 402. In an example, the same may be accomplished by a labelling tool as developed in software or hardware. The selection of points may be a manual-task performed as a human-action or may be automated as a random-selection of points.

At step 406, a text-file with Cartesian coordinates (i.e. X-Y coordinates) of selected-points is generated based on the selected points in Step 404.

At step 408, based on Cartesian coordinates as gathered in step 406, a point cloud generation is initiated. In an example, the python-script may be employed to generate the point cloud using raw depth data (i.e. depth. raw) pertaining to the image as captured.

At step 410, a point cloud as generated is obtained with respect to the image of step 402.

Steps 402 till 410 as executed may be understood in light of the IR image from the first camera. Likewise, the same operations may be executed in terms of IR image from the second camera 204 to obtain a second set of point cloud. Such two sets of point clouds have been further illustrated with respect to FIG. 5

Figure 5:
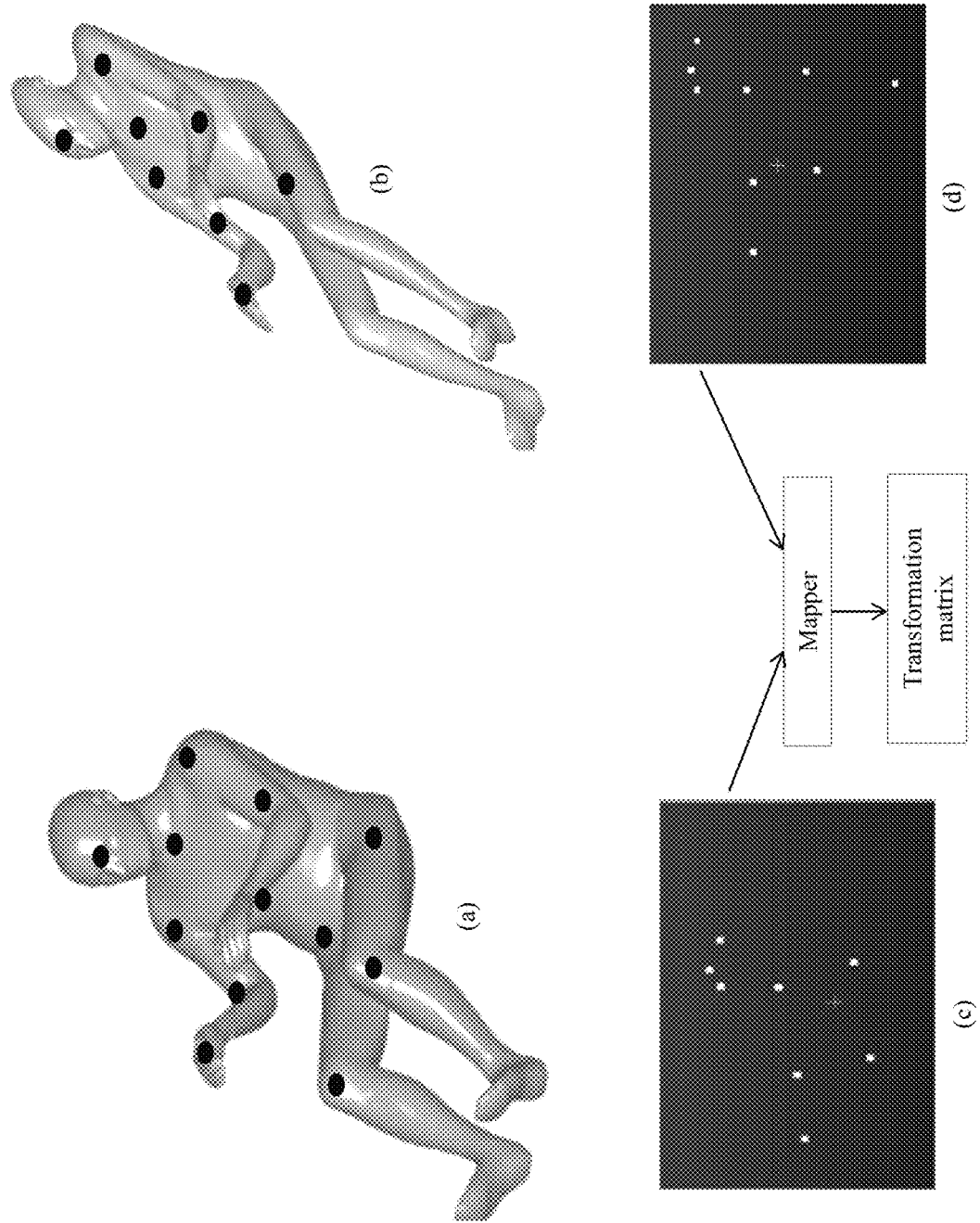
FIG. 5 illustrates an example process of generation transformation matrix, in accordance with an embodiment of present subject matter.

FIG. 5 illustrates an example process of generation of transformation matrix, in accordance with an embodiment of present subject matter. More specifically, the steps of FIG. 5 correspond to steps 102 and 104 of FIG. 1.

FIG. 5a and FIG. 5b represent selection of points upon the two images (captured from the first camera and the second camera) as have been captured and correspond to steps 402 to 406. Each of the selected points represented by black dot represents a Cartesian coordinate or a labelled-point. FIG. 5c and FIG. 5d represent the set of corresponding point-clouds with respect to said selected-points.

Based on point clouds of FIG. 5c and FIG. 5d, a transformation matrix is obtained. In an example, in case of master-slave camera configuration, a Master-ply file and a Slave-ply file corresponds to FIG. 5c and FIG. 5d respectively. Such ply files comprising the selected points are communicated to an example mapper such as CloudCompare (https://www.cloudcompare.org/doc/wiki/index.php?title=Align). The Slave ply points are aligned to Master ply points and generate a "Transformation Matrix".

While the present implementation depicts generation of transformation matrix in real-time, in other example a predefined transformation matrix based on the current positions of the first and second camera (i.e. master and slave cameras) may be also considered for usage instead of resorting to real-time generation.

Figure 6:
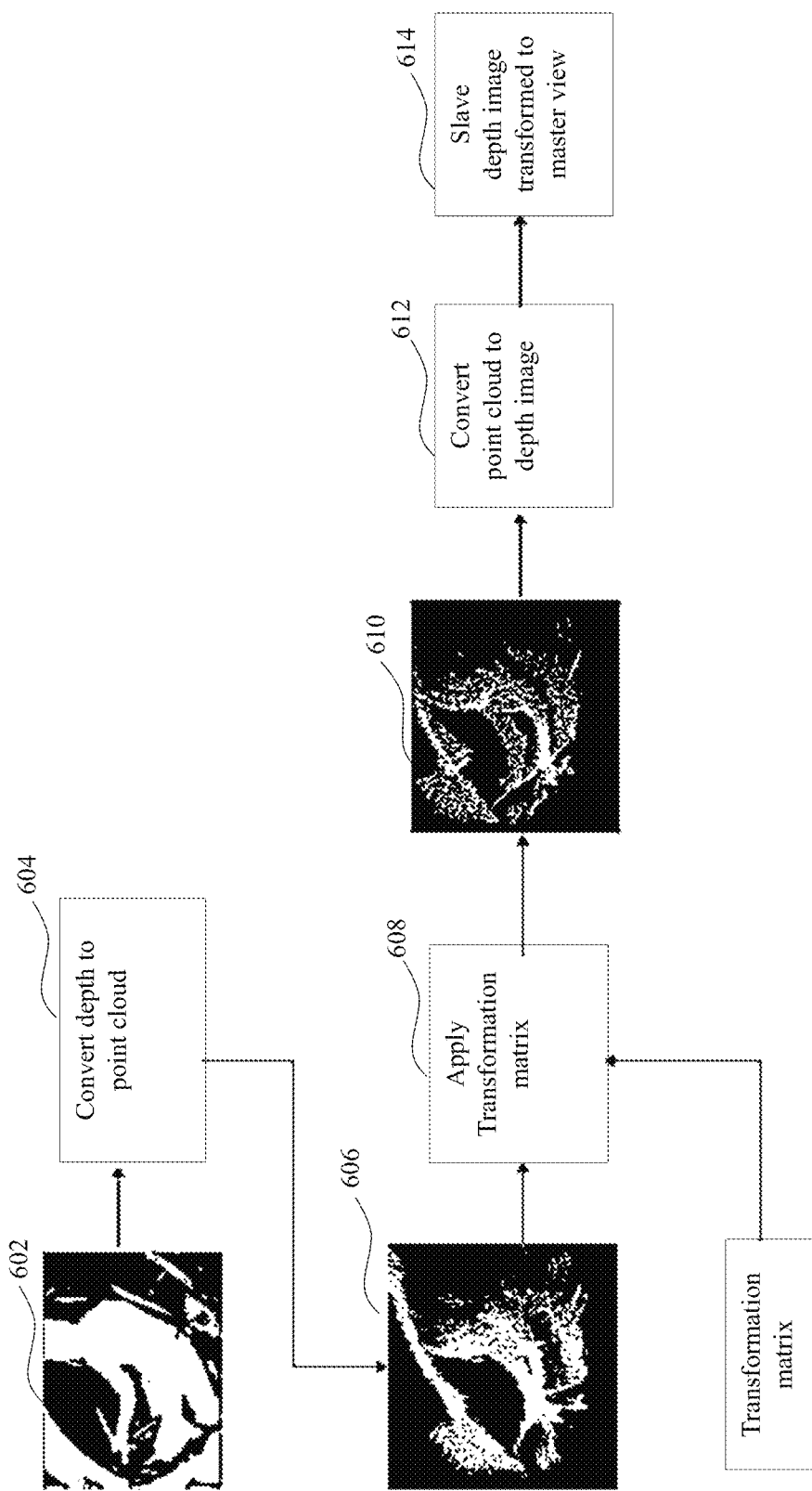
FIG. 6 illustrates example implementation of the method steps, in accordance with embodiment of the present subject matter.

FIG. 6 illustrates another example implementation of the method steps of FIG. 1, in accordance with an embodiment of the present embodiment. More specifically, the steps of FIG. 6 correspond to step 104 of FIG. 1.

At step 602, a depth image is captured with respect to second viewpoint or from the second camera 204, which may be also referred as the slave-camera 204.

At step 604, corresponds to generation of point cloud from the depth image in step 602. In an example, python script may be applied to convert the Depth image or raw depth data to Point Cloud.

At step 606, the point cloud is obtained and may be referred as the second image point cloud or slave point cloud for corresponding to second viewpoint. However, in another embodiment, the master point cloud or first viewpoint based point cloud may be used.

At step 608, the transformation Matrix as obtained in FIG. 5 may be applied to the point cloud of step 606. (e.g. Slave Point cloud (ply)) to obtain a morphed or modified point-cloud having characteristics of the second viewpoint point-cloud as well as the first viewpoint point cloud (i.e. master point cloud).

Step 610 depicts the resultant or modified point-cloud as obtained from the step 608. Such resultant point cloud may be referred as a "Slave pointcloud transformed to Masterview". However, in other scenario, wherein the transformation matrix is applied to master point cloud, the transformed point cloud may be referred as a "Master pointcloud transformed to Slaveview"

Step 612 depicts the conversion of transformed point cloud obtained in Step 610 to obtain a corresponding depth image or raw depth image-data. In an example, the Transformed Slave Point Cloud as obtained in step 610 is converted into Depth image using a python script Step 614 depicts achieving a "Slave Depth image transformed to Masterview".

Figure 7:
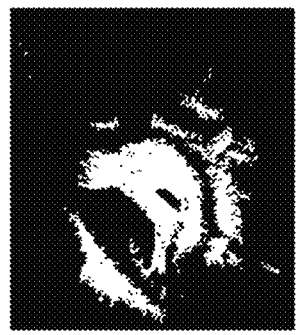
FIG. 7 illustrates example images as generated, in accordance with embodiment of the present subject matter.
Figure 7:
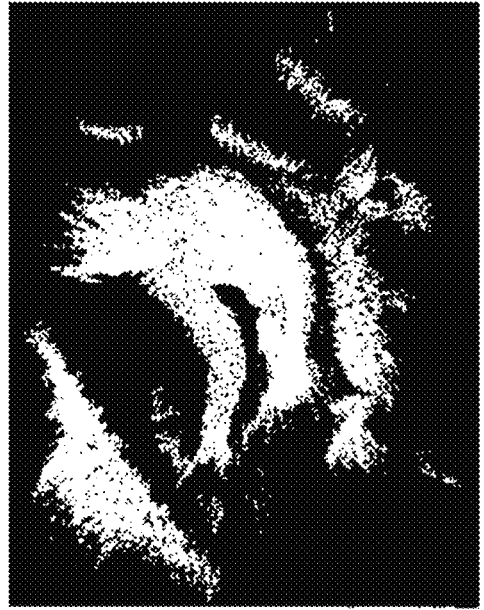
Figure 7:
Figure 7:
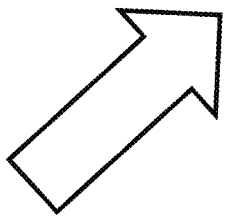
Figure 8:
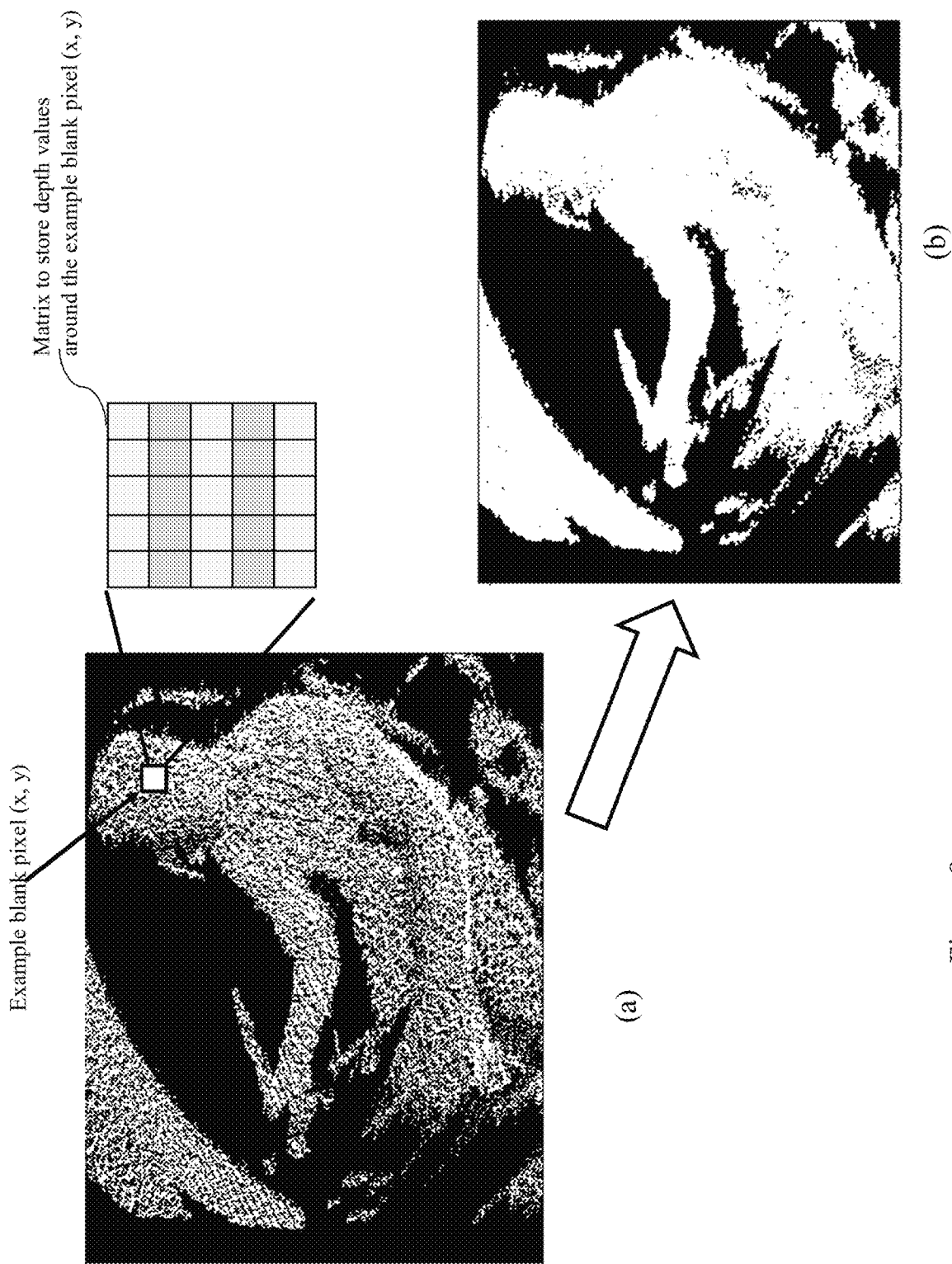
FIG. 8 illustrates example images as generated, in accordance with embodiment of the present subject matter.

The forthcoming FIG. 7 and FIG. 8 pictorially represents the transformation of image as outlined FIG. 6

FIG. 7 illustrates example images as generated, in accordance with another embodiment of the present subject matter. FIG. 7a depicts the slave point cloud (corresponding to the second camera or the second viewpoint) as corresponding to step 604 and 606. FIG. 7b further depicts the master point cloud as corresponding to the first camera or the first viewpoint. FIG. 7c corresponds to the "Slave pointcloud transformed to Masterview" as corresponding to the step 608.

FIG. 8 illustrates example image as generated, in accordance with embodiment of the present subject matter. More specifically, FIG. 8a corresponds to the "Slave Depth image transformed to Masterview" as obtained with respect to step 614.

FIG. 8b corresponds to an augmented version of the image of FIG. 8a. In an example the augmentation of FIG. 8a to FIG. 8b corresponds to the steps 106 and 108 of FIG. 1. The augmentation process comprises identifying the gaps or blank-pixels within the FIG. 8a and filling the gaps with necessary value to produce FIG. 8b.

In an implementation, for each pixel within FIG. 8a, a matrix of size 5×5 may be created to store 25 depth values nearby an example point (x, y) identified as blank pixel in FIG. 8a. An example matrix storing said 25 depth-values in the neighborhood of the example point (x, y) has been depicted through Table 1 as follows:

TABLE 1

| | | | | |
|---|---|---|---|---|
| (x − 2, y − 2) | (x − 1, y − 2) | (x, y − 2) | (x + 1, y − 2) | (x + 2, y − 2) |
| (x − 2, y − 1) | (x − 1, y − 1) | (x, y − 1) | (x + 1, y − 1) | (x + 2, y − 1) |
| (x − 2, y) | (x − 1, y) | (x, y) | (x + 1, y) | (x + 2, y) |
| (x − 2, y + 1) | (x − 1, y + 1) | (x, y + 1) | (x + 1, y + 1) | (x + 2, y + 1) |
| (x − 2, y + 2) | (x − 2, y + 2) | (x, y + 2) | (x + 2, y + 2) | (x + 2, y + 2) |

Remaining invalid values (e.g. pixel value for background) may be ignored. Accordingly, the blank pixel or the point (x,y) may be awarded a depth value of as the average of all remaining values.

At least by virtue of aforesaid, the identified blank pixels or gaps may be filled in FIG. 8a and the augmented version in the form of FIG. 8b may be obtained. Such version of FIG. 8b also corresponds to the complemented second image as referred in step 108.

Figure 9:
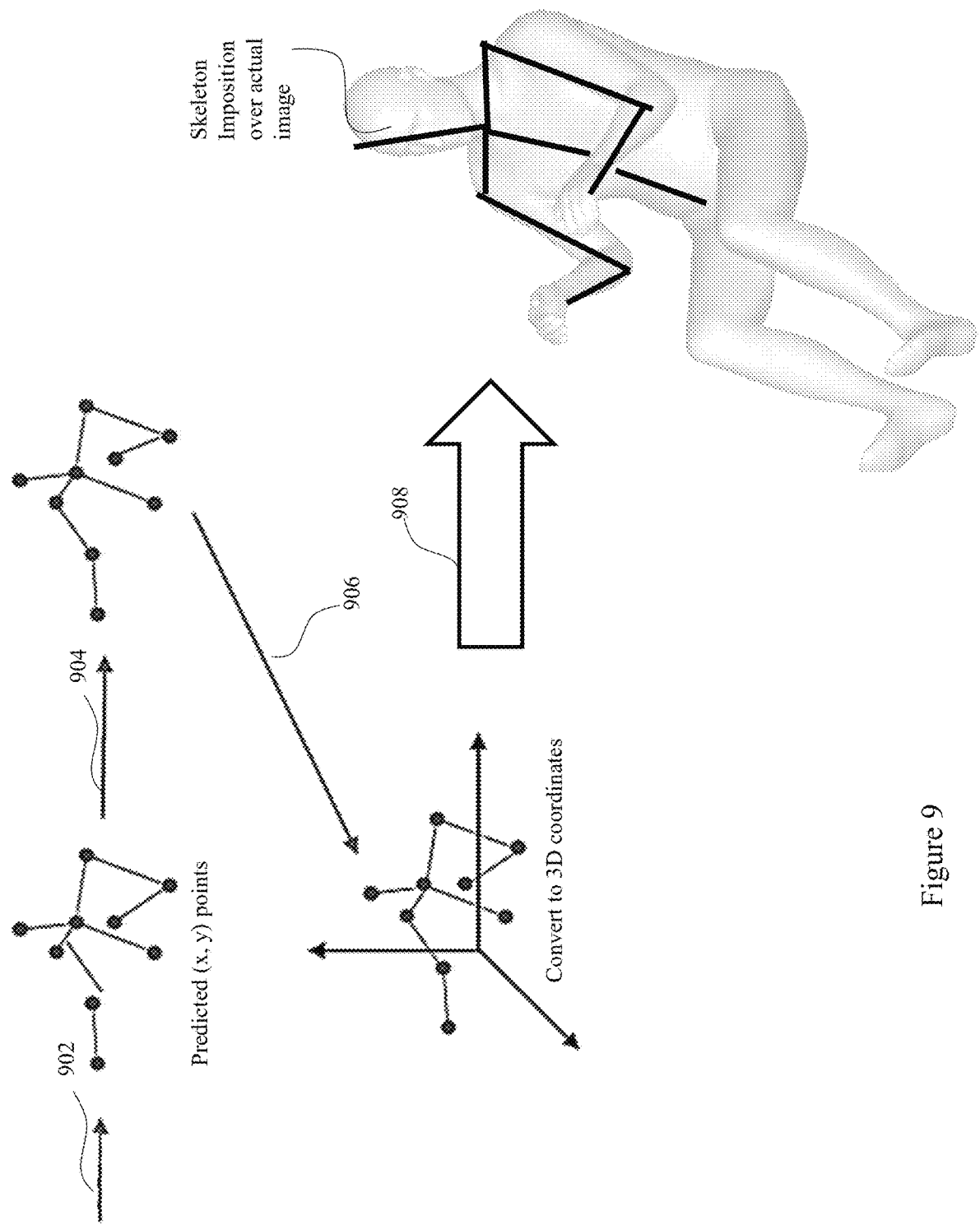
FIG. 9 illustrates an example implementation of the method steps, in accordance with another embodiment of the present subject matter.

FIG. 9 illustrates an example implementation of the method steps, in accordance with another embodiment of the present subject matter and corresponds to example-application of the present subject matter. Such example application may be prediction of skeleton of the driver based on a state of the art machine learning or convolutional neural network (CNN) techniques such as Spatio-Temporal Graph Convolution (STGC) Likewise, in case of multiple persons present, example deep learning based skeleton prediction techniques include Hidden Markov model, Recursive model, OpenPose model, RMPE (AlphaPose), Mask RCNN.

In operation, at step 902, the second-image of either FIG. 8a or FIG. 8b is received that is subject to the example skeleton prediction technique such as Spatio-temporal graph convolution (STGC) to predict the skeleton. The example skeleton as predicted may be a graph of 9 sets of two dimensional (2D) coordinates.

At step 904, example filtering techniques such as a median filter may be applied to remove noise and distortion from the skeleton predicted in STEP 902 and evolve a precise graphical representation of the predicted skeleton.

At step 906, example 2D to 3D mapping techniques such as SDK may be employed to convert the 2D graphical representation obtained in step 904 into 3D representation.

At step 908, the 3D skeleton of step 906 is super-imposed or fit (e.g. as a part of augmented reality) over the original master image of the driver as has been obtained by the first camera 202 or at the first view-point. In an example the original master image is a master IR image. However, the original master image may also be construed to cover photographic image of the driver.

In an extended implementation, the predicted skeleton may be leveraged to tracking the variations in the pose of the driver over a period of time can also be used for activity, gesture and gait recognition. Example use cases include detecting if a person has fallen down or is sick, applications that can autonomously teach proper work out regimes to the driver in case of burnout or stress, etc. Further, the predicted skeleton may be leveraged to mimic motion of the driver as a part of augmented reality and may be used to training robots.

Figure 10:
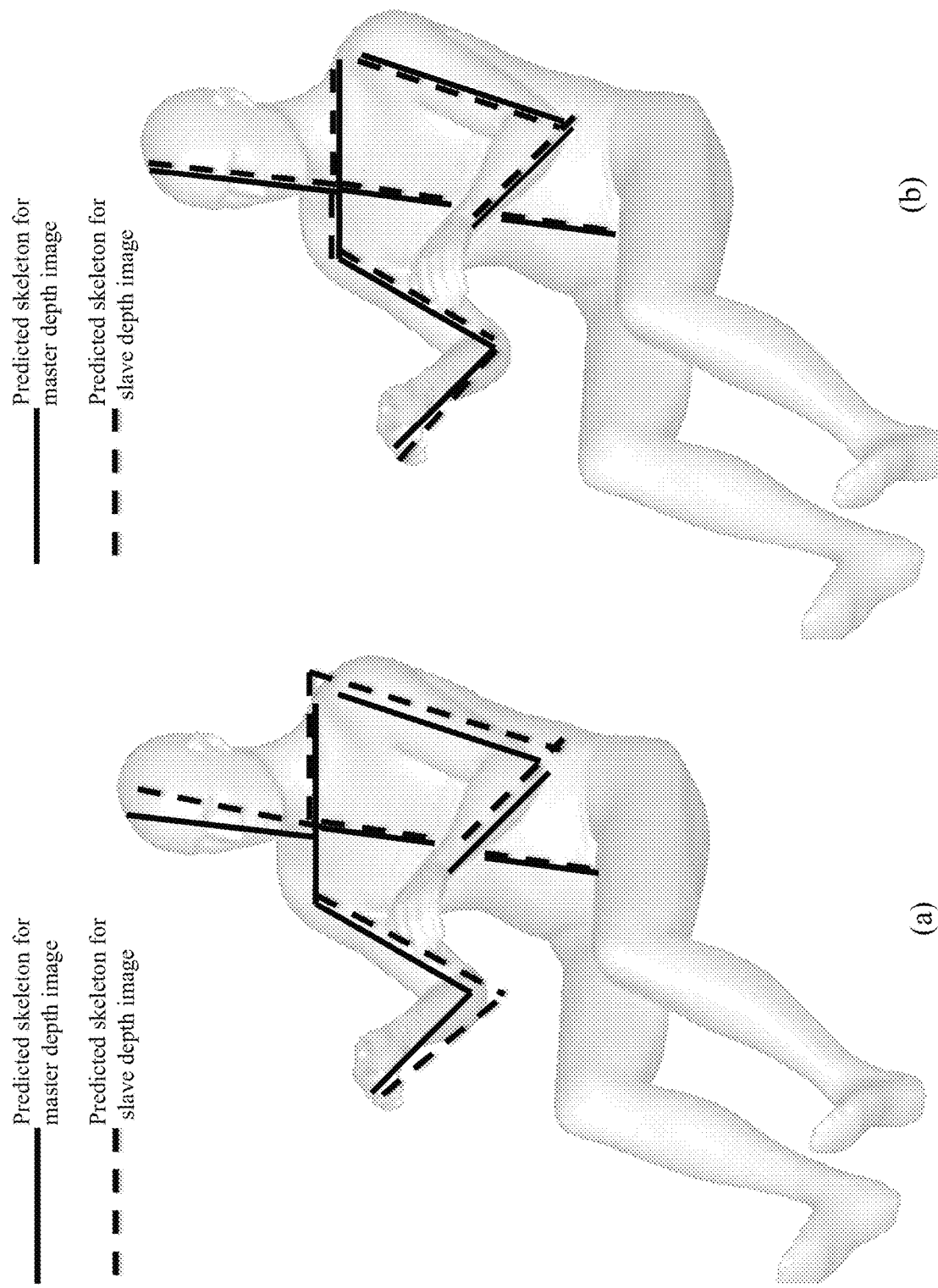
FIG. 10 illustrates results of the method steps, in accordance with embodiment of the present subject matter.

FIG. 10 illustrates results of the method-steps, in accordance with another embodiment of the present subject matter. More specifically, FIG. 10a illustrates the predicted skeleton with respect to the original master depth image as captured by the first camera 202 and represented by solid lines. FIG. 10a further illustrates the predicted skeleton with respect to converted depth image of FIG. 8a by broken lines. Likewise, FIG. 10b illustrates the predicted skeleton represented by solid lines with respect to the original master depth image as captured by the first camera, and the predicted skeleton represented by broken lines with respect to the converted depth image of FIG. 8b.

Accordingly, as may be clear from FIG. 10b, the increment in the density of filled gaps as done over FIG. 8a in order to achieve FIG. 8b results in a fine coincidence between the two predicted skeletons in FIG. 10b. In an example, the accuracy in terms of predicted-skeleton may be improvised from 76% to 84% in case FIG. 8b is utilized for prediction of skeletons over FIG. 8a.

Figure 11:
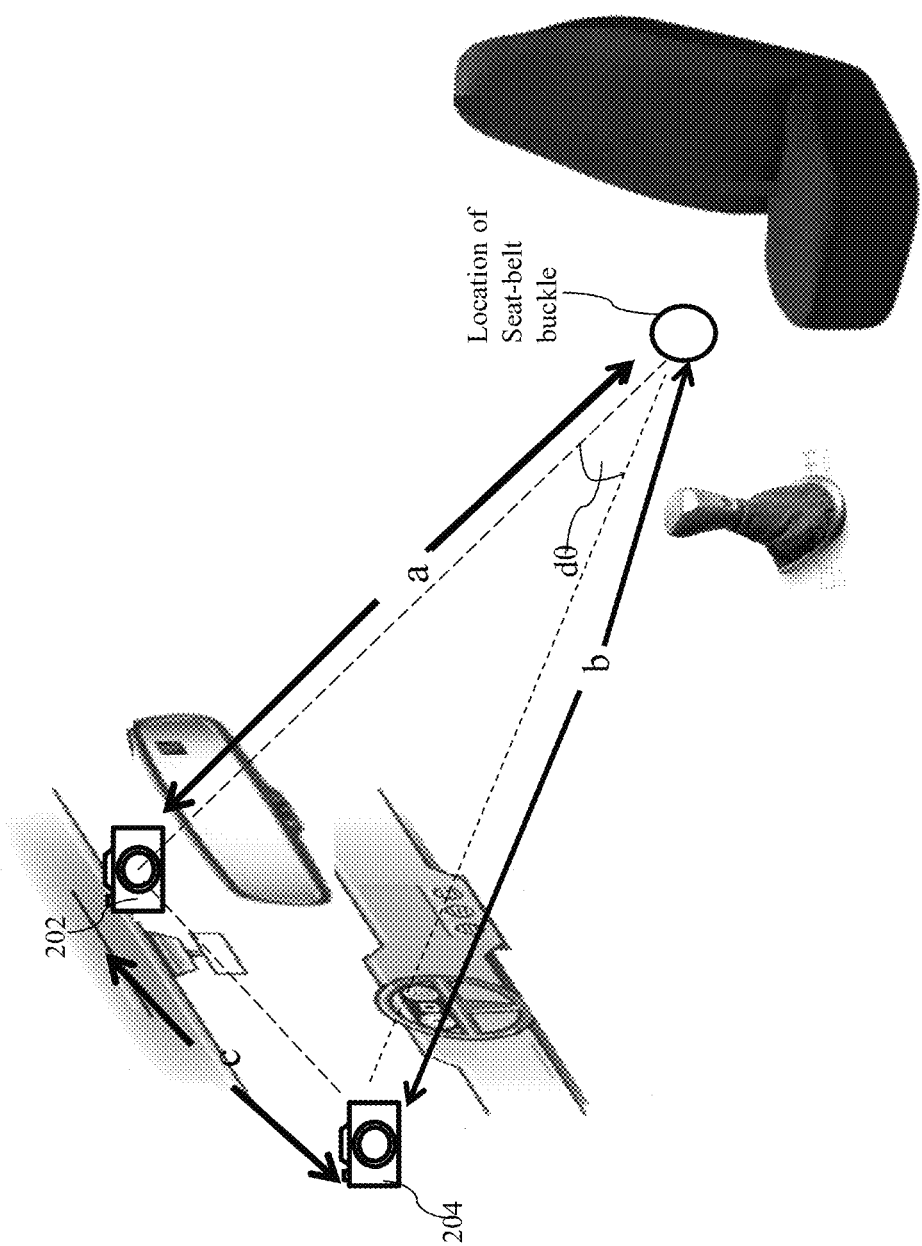
FIG. 11 illustrates example system implementation in accordance with an embodiment of the present subject matter.

FIG. 11 illustrates example system implementation in accordance with an embodiment of the present subject matter. More specifically, the present setup comprises a slave camera or a slave time of flight (TOF) camera 204 at a distance of approx. 20 cm left from the Master camera 202 or the master TOF in the horizontal direction. An angle dθ is calculated using "law of cosines" formula mentioned below:

$$d\theta = \arccos \frac{a^2 + b^2 - c^2}{2ab}$$

In an example, the Slave camera 204 is placed 20 cm to left of Master camera. The determined values for 'a', 'b' and 'c' are 76 cm, 74 cm and 20 cm. The value of "dθ" is determined as 15.249°

Figure 12:
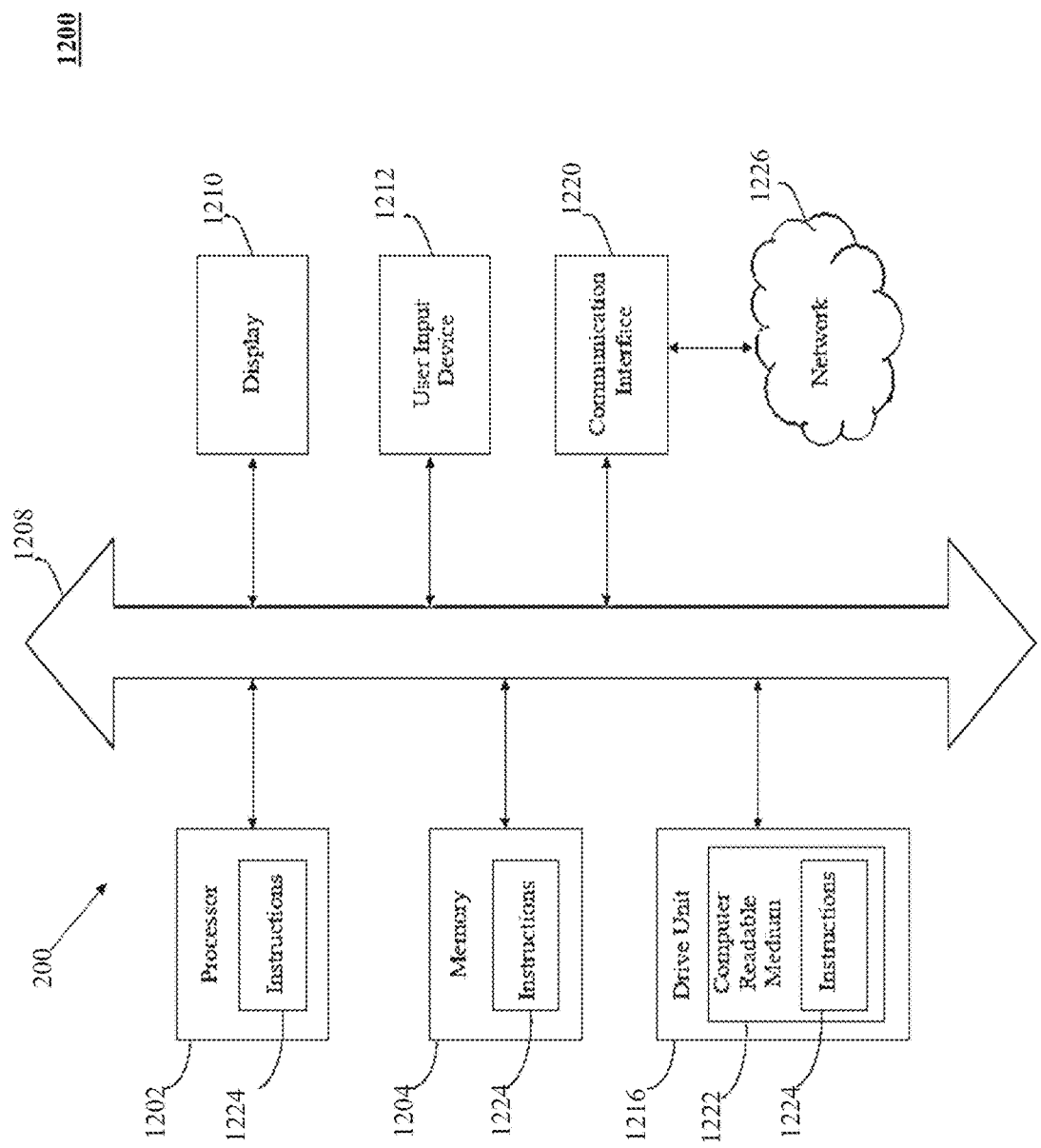
FIG. 12 illustrates an implementation of the system as illustrated in FIG. 2 in a computing environment.

FIG. 12 illustrates an implementation of the system 200 as illustrated in FIG. 2 in a computing environment. The present figure essentially illustrates the hardware configuration of the system 200 in the form of a computer system 1200 is shown. The computer system 1200 can include a set of instructions that can be executed to cause the computer system 1200 to perform any one or more of the methods disclosed. The computer system 1200 may operate as a standalone device or may be connected, e.g., using a network, to other computer systems or peripheral devices.

In a networked deployment, the computer system 1200 may operate in the capacity of a server or as a client user computer in a server-client user network environment, or as a peer computer system in a peer-to-peer (or distributed) network environment. The computer system 1200 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1200 is illustrated, the term "system" shall also be taken to include any collection of systems or subsystems that individually or jointly execute a set, or multiple sets, of instructions to perform one or more computer functions.

The computer system 1200 may include a processor 1202 (e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application specific integrated circuits, field programmable gate arrays, servers, networks, digital circuits, analog circuits, combinations thereof, or other now known or later developed devices for analyzing and processing data The processor 1202 may implement a software program, such as code generated manually (i.e., programmed).

The computer system 1200 may include a memory 1204, such as a memory 1204 that can communicate via a bus 1208. The memory 1204 may be a main memory, a static memory, or a dynamic memory. The memory 1204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1204 includes a cache or random access memory for the processor 1202. In alternative examples, the memory 1204 is separate from the processor 1202, such as a cache memory of a processor, the system memory, or other memory. The memory 1204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1204 is operable to store instructions executable by the processor 1202. The functions, acts or tasks illustrated in the figures or described may be performed by the programmed processor 1202 executing the instructions stored in the memory 1204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1200 may or may not further include a display unit 1210, such as a liquid crystal display (LCD), an organic light emitting diode (OLED), a flat panel display, a solid state display, a cathode ray tube (CRT), a projector, a printer or other now known or later developed display device for outputting determined information. The display 1210 may act as an interface for the user to see the functioning of the processor 1202, or specifically as an interface with the software stored in the memory 1204 or in the drive unit 1216.

Additionally, the computer system 1200 may include an input device 1212 configured to allow a user to interact with any of the components of system 1200. The input device 1212 may be a number pad, a keyboard, or a cursor control device, such as a mouse, or a joystick, touch screen display, remote control or any other device operative to interact with the computer system 1200.

The computer system 1200 may also include a disk or optical drive unit 1216. The disk drive unit 1216 may include a computer-readable medium 1222 in which one or more sets of instructions 1224, e.g. software, can be embedded. Further, the instructions 1224 may embody one or more of the methods or logic as described. In a particular example, the instructions 1224 may reside completely, or at least partially, within the memory 1204 or within the processor 1202 during execution by the computer system 1200. The memory 1204 and the processor 1202 also may include computer-readable media as discussed above.

The present invention contemplates a computer-readable medium that includes instructions 1224 or receives and executes instructions 1224 responsive to a propagated signal so that a device connected to a network 1226 can communicate voice, video, audio, images or any other data over the network 1226. Further, the instructions 1224 may be transmitted or received over the network 1226 via a communication port or interface 1220 or using a bus 1208. The communication port or interface 1220 may be a part of the processor 1202 or may be a separate component. The communication port 1220 may be created in software or may be a physical connection in hardware. The communication port 1220 may be configured to connect with a network 1226, external media, the display 1210, or any other components in system 1200 or combinations thereof. The connection with the network 1226 may be a physical connection, such as a wired Ethernet connection or may be established wirelessly as discussed later. Likewise, the additional connections with other components of the system 1200 may be physical connections or may be established wirelessly. The network 1226 may alternatively be directly connected to the bus 1208.

The network 1226 may include wired networks, wireless networks, Ethernet AVB networks, or combinations thereof. The wireless network may be a cellular telephone network, an 802.11, 802.16, 802.20, 802.1Q or WiMax network. Further, the network 1226 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 1200.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

The invention claimed is:

1. An image processing method comprising:
   receiving a first image of an object captured by a range-imaging device at a first viewing location;
   transforming the first image into a second image of the object, the second image corresponding to an image captured based on range-imaging at a second viewing location with respect to the object; and
   communicating the second image to a machine-learning (ML) unit, wherein:
   the ML unit is configured to be trained at least based on one or more images captured from the second viewing location, and
   the transforming the first image into the second image comprises:
      extracting a first point cloud from the first image captured as a depth image by a Time of Flight (TOF) camera acting as the range-imaging device at the first viewing location;
      accessing a pre-defined transformational matrix depicting a coordinate-mapping between images captured from the first viewing location and the second viewing location; and
      converting the first point cloud into a second point cloud based on the transformational matrix.

2. The image processing method according to claim 1, wherein the ML unit is configured to estimate a skeleton-structure of the object, thereby recognizing a skeleton-based action of the object.

3. The image processing method according to claim 1, further comprising correcting the second image to complement a gap between the first viewing location and second viewing location to result in a complemented second image,
   wherein the correcting the second image comprises identifying pixel-gaps within the second point cloud based on comparison with the first point cloud.

4. The image processing method according to claim 1, further comprising correcting the second image to complement a gap between the first viewing location and second viewing location to result in a complemented second image,
   wherein the correcting the second image comprises:
      filling the identified pixel-gaps within the second point cloud based on a pre-defined mechanism to complement the identified pixel-gaps within the second point cloud; and obtaining a complemented second point cloud as the complemented second image.

5. The image processing method according to claim 4, wherein the communicating the complemented second image to the ML unit comprises sending the complemented second point cloud to the ML unit.

6. The image processing method according to claim 1, further comprising generating the pre-defined transformation matrix by one or more of:
receiving at least one image of the object captured from the first viewing location;
receiving at least one another image of the object captured from the second viewing location;
designating a plurality of points within each of the at least one image of the object captured from the first viewing location and the at least one another image of the object captured from the second viewing location;
generating a first point cloud based on the designated plurality of points within the at least one image of the object captured from the first viewing location and a second point cloud based on the designated plurality of points within the at least one image of the object captured from the second viewing location; or
comparing the first and second point clouds to generate a transformational matrix.

7. A method for skeleton based action-recognition by imaging an object, the method comprising:
receiving a first image of an object captured by a range-imaging device at a first viewing location;
transforming the first image into a second image of the object, the second image corresponding to an image captured based on range-imaging at a second viewing location with respect to the object; and
estimating a skeleton-structure of the object by a predictive-analysis module based on the second image to facilitate skeleton based action-recognition of the object,
wherein the transforming the first image into the second image comprises:
extracting a first point cloud from the first image captured as a depth image by a Time of Flight (TOF) camera acting as the range-imaging device at the first viewing location;
accessing a pre-defined transformational matrix depicting a coordinate-mapping between images captured from the first viewing location and the second viewing location; and
converting the first point cloud into a second point cloud based on the transformational matrix.

8. The image processing method according to claim 7, wherein the predictive analysis module is configured to be trained at least based on one or more images of the object captured from the second viewing location by another range-imaging device.

9. An optical imaging system comprising:
at least one range-imaging device for capturing image from at least one viewing location; and
an image-generation unit configured for:
receiving a first image of an object captured from a first viewing location by the at least one range-imaging device;
transforming the first image into a second image of the object, the second image corresponding to an image captured by range-imaging at a second viewing location with respect to the object; and
a predictive-analysis unit for operating based on machine learning (ML) and configured to be trained at least based on one or more images captured from the second viewing location,
wherein the transforming the first image into the second image comprises:
extracting a first point cloud from the first image captured as a depth image by a Time of Flight (TOF) camera acting as the range-imaging device at the first viewing location;
accessing a pre-defined transformational matrix depicting a coordinate-mapping between images captured from the first viewing location and the second viewing location; and
converting the first point cloud into a second point cloud based on the transformational matrix.

10. The optical imaging system as claimed in claim 9, wherein the ML unit is configured to estimate a skeleton-structure of the object, thereby recognizing skeleton-based action of the object.

11. The optical imaging system as claimed in claim 9, wherein the at least one range-imaging device operates based on at least one of:
Stereo triangulation,
Sheet of light triangulation,
Structured light,
Time-of-flight,
Interferometry, or
Coded aperture.

12. The optical imaging system as claimed in claim 9, further comprising a camera for imaging the object from the second viewing location, the camera being defined as one or more of:
a range-imaging device,
an infra-red camera, or
a photography camera.

13. The optical imaging system as claimed in claim 9, wherein the at least one range imaging device is movable to capture images of the object both from the first viewing location and the second viewing location.

14. The optical imaging system as claimed in claim 9, wherein the at least one range imaging device is defined as at least one of:
a master camera; or
a slave camera configured for communicating the master camera image data captured by the slave camera.

15. The optical imaging system as claimed in claim 14, wherein the master camera houses an image processing unit that receives image data captured by the master camera and receives the image data captured by the slave camera.

16. The optical imaging system as claimed in claim 9, wherein the at least one range-imaging device is implemented inside a vehicle and defined by at least one of:
a master camera mounted at a central location acting as the first viewing location within the vehicle; or
a slave camera offset from the central location by a pre-determined distance and mounted at the second viewing location within the vehicle.

17. The optical imaging system as claimed in claim 16, wherein image-generation unit is defined as at least one of
a processing unit of the master camera; or
a processing module forming a part of an engine control unit (ECU) of the vehicle.

* * * * *